A. KASSLER.
EAR RING.
APPLICATION FILED OCT. 17, 1917.
1,304,986.
Patented May 27, 1919.
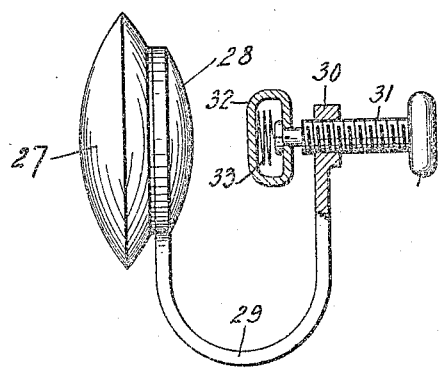
INVENTOR.
A. Kassler
BY Sigmund Herzog
his ATTORNEY

UNITED STATES PATENT OFFICE.

ADOLF KASSLER, OF NEW YORK, N. Y.

EAR-RING.

1,304,986.

Specification of Letters Patent.

Patented May 27, 1919.

Application filed October 17, 1917. Serial No. 197,172.

*To all whom it may concern:*

Be it known that I, ADOLF KASSLER, a subject of the Emperor of Austria, and a resident of New York, in the county of New York and State of New York, have invented certain new and useful Improvements in Ear-Rings, of which the following is a specification.

The present invention relates to improvements in ear-ornaments or ear-rings which are fastened to the ears by screws, including a rotary element that, in gripping position, abuts against the rear face of the lobe of the ear.

The rotary element referred to includes usually a disk that is made integral with a screw shank and has a tendency to lacerate the skin of the ear when screwed up hard and turned.

The main object of the present invention is to provide a gripping disk or element which is free from the objections stated, that is to say, which will not injure the skin of the ear when brought to its operative position.

Another object of the invention is to produce a device of the type mentioned which can be manufactured on a commercial scale, or, in other words, one which is not so difficult to make as to be beyond the reasonable cost of such a device.

With these and other objects in view, which will more fully appear as the nature of the invention is better understood, the same consists in the combination, arrangement and construction of parts hereinafter fully described, pointed out in the appended claim and illustrated in the accompanying drawings, it being understood that many changes may be made in the size and proportion of the several parts and details of construction within the scope of the appended claim without departing from the spirit or sacrificing any of the advantages of the invention.

One of the many possible embodiments of the invention is illustrated in the accompanying drawing, which represents a side elevation, partly in section, of an ear-ring constructed in accordance with the present invention.

In the drawing an ear ornament is shown which is fastened to the ear by means of a friction gripping device, instead of by holes in the ears and screws on the ear-rings. In this construction the numeral 27 denotes the setting for gems or stones. This setting is provided upon its rear face with a stationary grip 28. The setting is attached to a looped wire 29, carrying a nut 30. With this nut mesh the threads of a screw shank 31, upon the front end of which is loosely mounted a movable gripping member 32. This member is made preferably in the form of a casing and is rotatably and shiftably held upon the said shank. A spring 33 is disposed within the movable gripping member 32. This spring bears against the shank 31 and against the gripping member 32, tending to force the latter toward the stationary grip 28.

The operation of this device is as follows:—The lobe of the ear is inserted in the opening between the stationary grip 28 and the movable gripping member 32. The width of the opening may then be lessened by turning the screw 31 in the proper direction, whereby the ear is gripped. Inasmuch as the movable gripping member is rotatably mounted on the screw 31, it has no tendency to lacerate the skin of the ear. Furthermore, the spring within the gripping member 32 makes the latter yielding, thereby preventing a too tight grip when the screw 31 is turned beyond the proper point.

What I claim is:—

In an ear-ring, the combination with a gem setting, of a nut fixed thereto, a screw shank in mesh with said nut, an ear-gripping member rotatable and longitudinally shiftable on said shank, and a spring within said gripping member tending to force said gripping member toward said jewel setting.

Signed at New York, in the county of New York, and State of New York, this 20th day of August, A. D. 1917.

ADOLF KASSLER.

Copies of this patent may be obtained for five cents each, by addressing the "Commissioner of Patents, Washington, D. C."